United States Patent [19]

Ferro et al.

[11] 4,131,127

[45] Dec. 26, 1978

[54] LOCKING VALVE

[76] Inventors: Jose V. Ferro, 3655 Glenhaven, Houston, Tex. 77025; Vincent M. Morales, 723 Cramer Ct., Katy, Tex. 77450; Billy G. Reid, 1402 Avenue A, Houston, Tex. 77587

[21] Appl. No.: 763,319

[22] Filed: Jan. 28, 1977

[51] Int. Cl.² ............................................. F16K 35/06
[52] U.S. Cl. ................................. 137/384.6; 70/242; 137/315; 137/354; 251/331
[58] Field of Search ........................ 70/242, 243, 244; 137/315, 354, 383, 384.2, 384.4, 384.6, 384.8, 385; 251/61.1, 331, 367

[56] References Cited

U.S. PATENT DOCUMENTS

| | | | |
|---|---|---|---|
| 1,524,904 | 2/1925 | Berardi | 137/384.2 X |
| 2,539,088 | 1/1951 | Leach | 137/383 |
| 2,845,943 | 8/1958 | Perkins | 137/384.6 |
| 3,776,263 | 12/1973 | Hubenthal | 137/354 X |
| 3,855,828 | 12/1974 | Verderber | 137/384.2 X |
| 3,885,586 | 5/1975 | Tibbetts | 137/354 |
| 4,021,016 | 5/1977 | Hart | 251/367 X |

FOREIGN PATENT DOCUMENTS

| | | | |
|---|---|---|---|
| 2235990 | 2/1973 | Fed. Rep. of Germany | 251/61.1 |
| 591998 | 4/1959 | Italy | 137/384.8 |
| 169632 | 1/1959 | Sweden | 137/384.6 |
| 837642 | 6/1960 | United Kingdom | 137/384.6 |

*Primary Examiner*—Gerald A. Michalsky
*Attorney, Agent, or Firm*—Browning, Bushman & Zamecki

[57] ABSTRACT

Disclosed is a valve for selectively preventing fluid flow along a flow line. A plunger of a locking mechanism moves a valve stem between a first position, in which the valve is in an open configuration, and a second position in which the valve stem presses a resilient diaphragm into sealing engagement with an annular seat circumscribing an outlet port resulting in a closed configuration for the valve. The valve stem may be moved from the second position to the first position only by unlocking the locking mechanism. In the embodiment shown, the valve is interposed along a fuel flow line between a fuel supply and an engine in a motor vehicle. Inlet and outlet flow line receiving means are integrated in a plastic housing, which includes two components riveted together.

3 Claims, 7 Drawing Figures

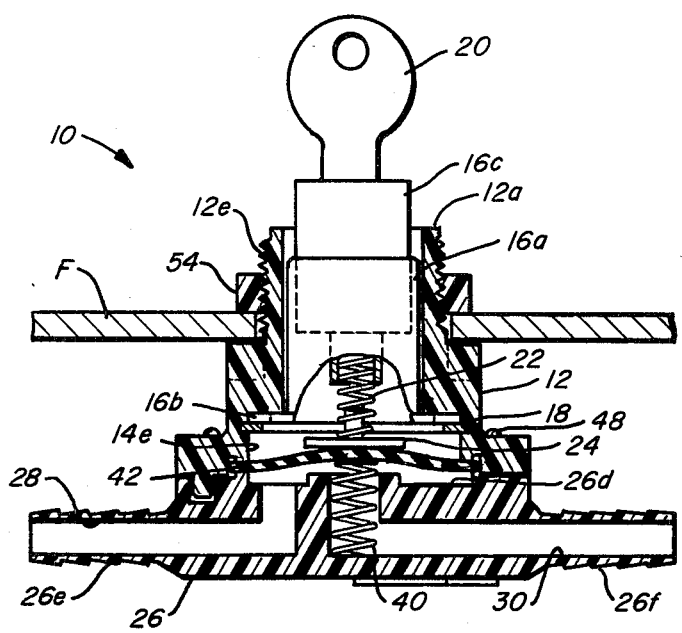
FIG. 2
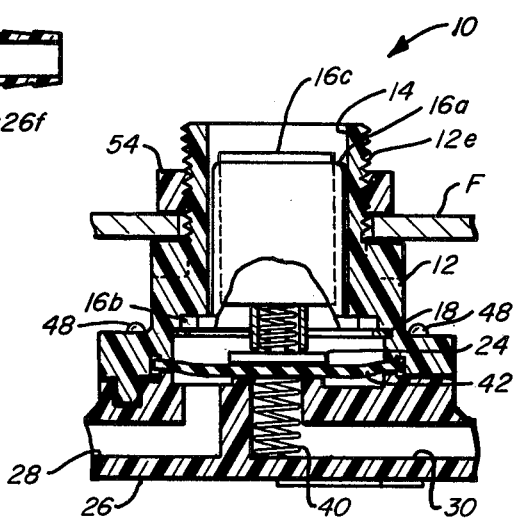
FIG. 3
FIG. 6
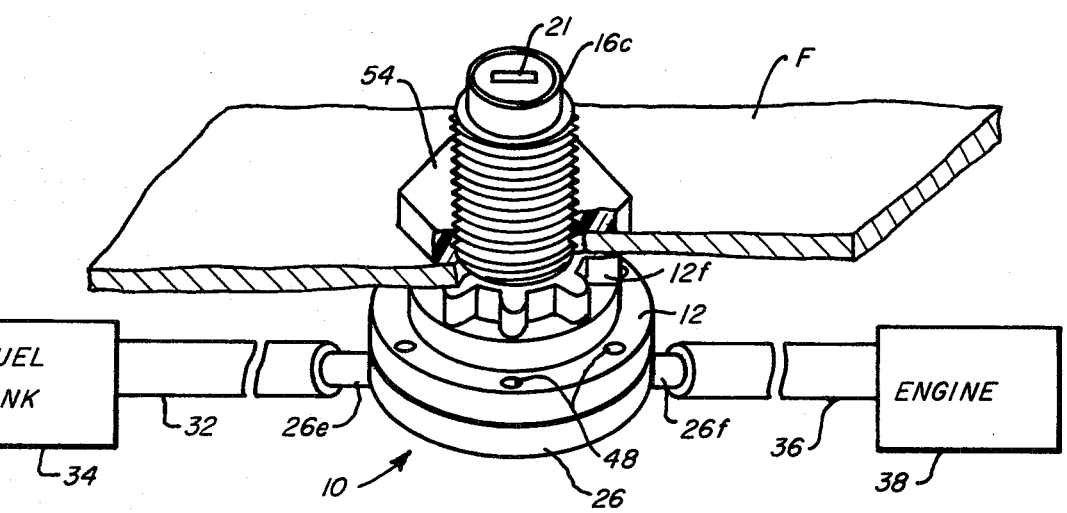
FIG. 7

LOCKING VALVE

BACKGROUND OF THE INVENTION

1. Field of the Invention

The present invention is related to lockable valves for controlling fluid flow in flow lines. More particularly, the present invention pertains to security devices for selectively preventing unauthorized activity involving use of a fluid obtainable by passage through a flow line.

2. Description of the Prior Art

Security devices have been designed for preventing unauthorized use of an engine operable on fluid fuel whereby a valve is closed to prevent the fuel from being transmitted from the fuel supply to the engine. The valve is locked in the closed position, and may be returned to the open position, thereby permitting transmission of the fluid fuel to the engine, only by use of a key or combination to release the locking mechanism. U.S. Pat. Nos. 1,303,878; 1,600,050; 1,713,635; 3,773,139; and 3,792,712 describe such locking valves, and show a variety of means for effecting the locking of the valve in the closed configuration. Particular attention is devoted to the application of such security devices to motor vehicles, such as automobiles. U.S. Pat. No. 2,115,784 shows a lockable valve mounted adjacent the engine of an automobile, and connected by a shaft and joint combination to an actuating mechanism on the dashboard of the vehicle. U.S. Pat. Nos. 2,881,789 and 3,776,263 disclose lockable fuel line valves which may be mounted in the floorboard of a motor vehicle while extending below the floorboard to be incorporated in the fuel flow line between the gasoline tank and the vehicle engine. The valves may be operated from within the vehicle by inserting a key in the lock mechanism exposed to the interior of the vehicle through the floorboard. Both such valves employ rotary lock mechanisms, with the valve of U.S. Pat. No. 3,776,263 converting the rotary motion of the locking mechanism into translatory movement of a valve body into and out of sealing engagement with a seat. The valve shown in U.S. Pat. No. 2,881,789 directly links the rotary motion of the locking mechanism to rotation of a plug valve.

Another prior art security valve employs a plunger type locking mechanism, and is also mountable in the floorboard of a motor vehicle for operation from within the vehicle. With such a locking mechanism, the valve may be closed and locked in the closed configuration by the operator simply depressing the plunger of the locking mechanism. Rotation of an element of the plunger with the use of a key releases the plunger to be returned to the open configuration by a spring mechanism within the locking mechanism itself. Within the valve body, the plunger of the locking mechanism carries a valve stem which presses a resilient seal against an annular seat surrounding an outlet port. The outlet port communicates through the bottom of the housing to that portion of the fuel flow line leading to the engine. When the plunger of the locking mechanism is raised, the valve stem is withdrawn from the pressing engagement with the resilient seal and the seat, and the outlet port then communicates with an inlet port. That portion of the fuel flow line extending from the fuel tank communicates with the inlet port. Tubing fittings join both segments of the fuel flow line to the housing. The housing itself is constructed of two metal components which are held together by screws. Screws are also employed to anchor the locking mechanism in one portion of the housing. The union of the two housing components also serves to anchor the resilient diaphragm which provides the resilient seal between the valve stem and the seat. This anchoring of the diaphragm occurs between an annular lip on one housing component facing an annular shoulder on the other housing component.

SUMMARY OF THE INVENTION

The present invention is an improvement on the last-described security valve. The invention includes improvements directed toward increasing the integrity of the valve housing, thereby increasing the ability of the valve to fulfill its purpose as a security device, as well as increasing the practicality of the apparatus by simplifying and otherwise improving its construction. Similarly, the advantages of lightweight and corrosion-resistant molded plastic are realized in the construction of the present invention as an improvement over the extensive use of metal in the prior art valve. Consequently, the present invention includes an improved security valve for selectively preventing the flow of fluid in a flow line, the valve being mountable in a motor vehicle floorboard and operable from within the vehicle by pressing a plunger device to close and lock the valve, and selectively opening the valve by releasing the locking mechanism with the use of a key, the valve mechanism featuring improved fluid-sealing and a housing of economical construction designed to be maintenance-free and secure against unauthorized opening for tampering with the valve mechanism.

BRIEF DESCRIPTION OF THE DRAWINGS

FIG. 2 is an elevational view, in partial crosssection and partly broken away, of the valve parts of FIG. 1 as assembled, with the valve in the open configuration, and showing a key in the locking mechanism;

FIG. 3 is a view similar to FIG. 2, but without the key, and showing the valve in the closed configuration;

FIG. 6 is a perspective view of the locking mechanism, showing the arcuate flange for preventing rotation of the lock casing; and FIG. 7 is a perspective view of the valve of the present invention, mounted on a motor vehicle floorboard, with the position of the valve relative to a fuel tank and engine indicated schematically.

DESCRIPTION OF A PREFERRED EMBODIMENT

Figure 1:
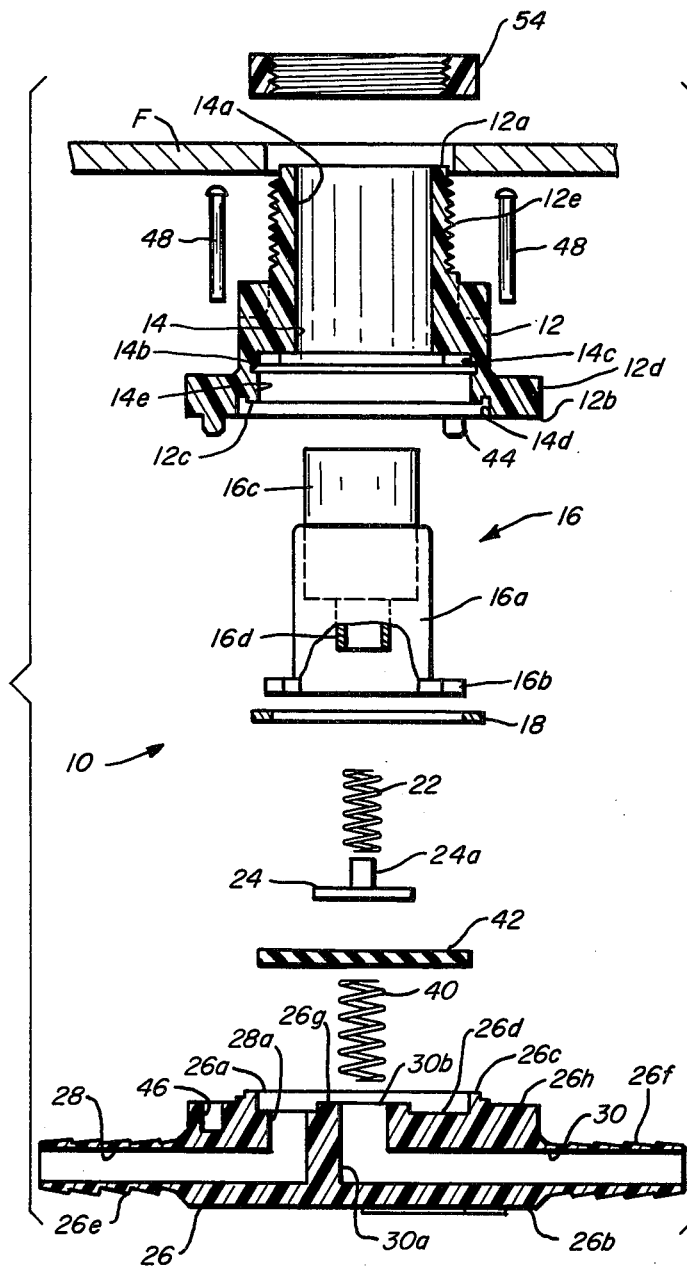
FIG. 1 is an elevational exploded view, in partial cross-section and partially broken away, showing the parts of the lockable valve of the present invention, with the plunger of the locking mechanism in the open position.

The lockable valve of the present invention is illustrated at 10 in FIGS. 1-3. An upper, or first, housing component 12 features a segmented cylindrical passage, or opening, 14 extending the length of the upper housing component from its upper, or first, end 12a to its lower, or second, end 12b. The cylindrical opening 14 includes a first passage 14a sufficiently large in diameter to accommodate the cylindrical portion of the casing 16a of a locking mechanism shown generally at 16. The locking mechanism 16 may be varied in construction, and is described and illustrated only generally. An arcuate flange 16b, best seen in FIG. 6, protrudes radially outwardly from the casing 16a to prevent the casing from passing entirely through the passage 14a beyond the first end 12a of the upper housing component 12.

Figure 4:
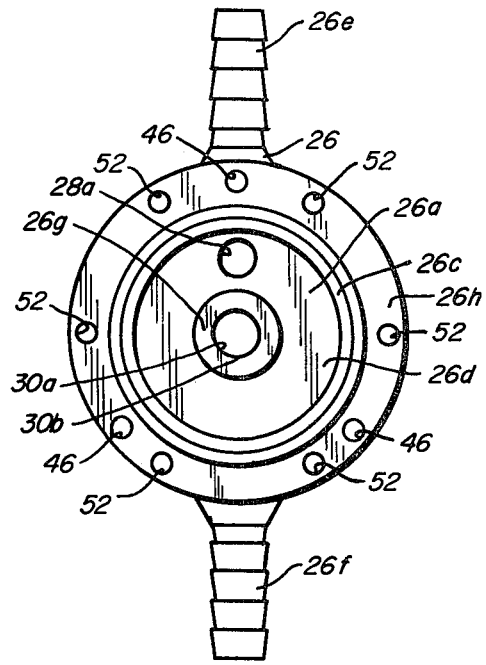
FIG. 4 is a top plan view of the lower housing component.

A second passage 14b is provided by an annular groove extending radially outwardly into the interior surface of the first housing component 12. A third passage 14c, shaped in keyed fashion as seen in FIG. 4, lies between the first and second passages 14a and 14b, respectively. The arcuate flange 16b of the locking mechanism 16 fits within the keyed third passage 14c. With the locking mechanism 16 in place as seen in FIG. 2 a snap ring 18 is held in the groove 14b and acts as a stop against the arcuate flange 16b to prevent the casing 16a of the locking mechanism 16 from moving out of the first passage 14a toward the second end 12b. Thus, the keyed third passage 14c cooperates with the snap ring 18 to hold the casing 16a of the locking mechanism longitudinally fixed relative to the first housing component 12 by confining the arcuate flange 16b.

The locking mechanism 16 includes a plunger device 16c which is movable between a first position in which the plunger extends above the first end 12a of the first housing component 12 in the assembled apparatus shown in FIG. 2, and a second position in which the plunger is depressed within the casing 16a, and does not extend beyond the housing component first end 12a as illustrated in FIG. 3. A spring mechanism (not shown), as part of the locking mechanism 16, urges the plunger device 16c from the second position to the first position. However, depressing the plunger device 16c into the casing 16a causes the locking mechanism 16 to operate to hold the plunger fixed in the second position by appropriate means (not shown) within the locking mechanism. Only by rotation of a key 20, inserted in a keyhole 21 in the top of the plunger device 16c (see FIG. 7), relative to the casing 16a can the internal locking means be released to allow the internal spring mechanism to return the plunger to the first position. Thus, the locking mechanism 16 may be placed in the locked configuration by the application of pressure to move the plunger 16c from the first position to the second position, while the unlocking of the apparatus may be achieved only by use of a key 20 to permit the release of the plunger device from the second position. The setting of the arcuate flange 16b within the keyed third passage 14c prevents rotation of the casing 16a relative to the first housing component 12 as the key 20 is rotated within the plunger device 16c.

The end of the plunger device 16c opposite the end which receives the key 20 is fitted with a downwardly directed cylindrical sleeve 16d which receives a valve stem spring 22. A valve stem 24 includes a shaft 24a which passes into the spring 22 and is secured therein by friction. Thus, as the plunger device 16c is selectively moved between the aforementioned first and second positions, the valve stem 24 is also propelled between first and second positions corresponding to the first and second positions, respectively, of the plunger device. However, it will be appreciated that a degree of flexability is provided the movement of the valve stem 24 by its mounting within the valve stem spring 22. The purpose of this flexability will be discussed in detail hereinafter.

A second housing component 26, having a first, or upper, side 26a, illustrated in detail in FIG. 4, and a bottom, or second, side 26b, is mated with the first housing component 12 as shown in FIGS. 2 and 3. The upper side 26a of the second housing component 26 features an annular, axially extending lip 26c which fits within a fourth passage 14d opening to the second end 12b of the first housing component 12. An annular, axially extending lip 12c protrudes downwardly into the fourth passage 14d, and faces the upwardly directed second housing component lip 26c when the first and second housing components 12 and 26, respectively, are mated. The lip 12c also defines the lower extent of a fifth passage 14e positioned between the groove 14b and the fourth passage 14d. With the upper housing component 12 and mated with the lower housing component 26, the two lips 12c and 26c cooperate to form an annular clamping mechanism surrounded by an annular spacing, and circumscribing a chamber formed by a combination of the fifth passage 14e of the upper housing component 12 and a depression 26d positioned radially within the lip 26c on the first surface 26a of the second housing component.

The second housing component 26 includes an inlet flow passage 28 passing along the interior of an inlet flow line receptacle 26e, and turning upwardly to end in an inlet port 28a within the depression 26d. An outlet flow passage 30 similarly passes along the interior of an outlet flow line receptacle 26f, and includes an axial segment 30a ending in an outlet port 30b centered within the circular depression 26d. The inlet and outlet flow line receptacles 26e and 26f, respectively, each feature a series of frustoconical surfaces providing multiple annular shoulders (FIGS. 1, 2 and 4) for anchoring resilient flow line tubular members passing over the flow line receptacles, as shown in FIG. 7. As shown schematically in FIG. 7, an inlet flow line tubular member 32 leads from a fuel tank, or supply, 34 to the valve 10 of the present invention. An outlet flow line tubular member 36 extends from the valve 10 to the engine 38. Thus, the valve 10 of the present invention may be situated in line between the fuel supply and the engine of a motor vehicle, and serves to selectively interrupt the availability of fluid fuel from the supply tank to the engine to operate the motor vehicle. The flow line tubular members 32 and 36 may generally be connected to the valve 10 by simply slipping the tubular members over the corresponding flow line receptacles 26e and 26f, respectively. The exterior multiple shoulders of the flow line receptacles 26e and 26f cooperate with the resilient nature of the flow lines 32 and 36, respectively, to provide fluid-tight friction gripping between the flow line receptacles and the tubular members. In general, no additional fittings are needed to join the flow line tubular members to the valve 10. However, a constricting device, such as a clamp, may be applied to the exterior of the portion of the flow line tubular member that is slipped over the corresponding flow line receptacle, and tightened to enhance the engagement between the interior of the flow line tubular member and the exterior of the receptacle.

The outlet port 30b within the depression 26d of the second housing component 26 is surrounded by an annular seat 26g. When the first and second housing components 12 and 26, respectively, are mated as illustrated in FIG. 2, the seat 26g is aligned with the valve stem 24. Thus, longitudinal movement of the valve stem 24 generally with the plunger device 16c of the locking mechanism 16 causes the valve stem to be moved toward and away from the seat 26g. A counter spring 40 sits in the axial segment 30a of the outlet flow passage 30 and extends above the seat 26g if the counter spring is permitted to achieve its relaxed state.

A resilient diaphragm seal 42 provides fluid-tight sealing between the first and second housing components 12 and 26, respectively, in the mated configuration of FIGS. 2 and 3. To achieve this sealing effect, the diaphragm seal 42 is positioned generally between the first and second housing components 12 and 26, respectively, and is held in the clamping mechanism formed by the annular lips 12c and 26c as noted hereinbefore. Thus, the diaphragm seal 42 acts as a gasket while being held by the lips 12c and 26c. With the annular clamping provided by the lips 12c and 26c, the diaphragm seal 42 also functions as a diaphragm to divide the chamber, formed generally by the fifth passage 14e and the depression 26d, into two segments, and is characterized by its interior portions being generally movable along the central axis of the valve 10. Thus, as the plunger device 16c is propelled downwardly within the casing 16a, the valve stem 24 is forced against the diaphragm seal 42 from above, and presses the seal in fluid-tight engagement against the seat 26g, causing the counter spring 40 to be compressed within the outlet flow passage 30. When the plunger device 16c is returned to its first position, the valve stem 24 is permitted to be raised, and the counter spring 40 acts to propel the center of the diaphragm seal 42 off of the seat 26g.

When the first and second housing components 12 and 26, respectively, are joined as described hereinbefore, a flange 12d at the second end 12b of the first housing component contacts an annular surface 26h included as part of the first surface 26a of the second housing component 26. One or more pins 44 extending downwardly from the flange 12d are positioned to fit within corresponding indentations 46 arranged about the annular surface 26h. The pins 44 and the indentations 46 thus cooperate as a male and female coupling device to insure that the first and second housing components 12 and 26, respectively, are selectively mutually oriented rotationally as well as laterally when the two housing components are mated as described hereinbefore. When more than one such pin and indentation combination is used, the combination may be arranged non-symetrically about the flange 12d and the annular surface 26h so that the first and second housing components may be mated in one configuration only, with respect to the rotational orientation of one housing component relative to the other. In the embodiment shown, three such pins 44 and corresponding identations 46 are used. It will be appreciated that the positions of the pins 44 and the indentations 46 may be reversed, such that the pins may be placed on the annular surface 26h while the indentations may be provided in the flange 12d. Also, a variation of such placements, where more than one pin and indentation combination is used, may be provided so that one or more pins are located on both the flange 12d and the annular surface 26h, while a corresponding number of opposing indentations are located on the appropriate elements.

Figure 5:
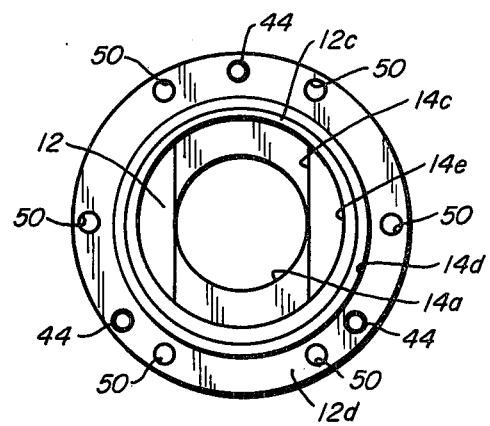
FIG. 5 is a bottom plan view of the upper housing component.

The flange 12d also provides a receptacle for receiving one or more rivets 48 passing through throughbores 50 in the flange and appropriately placed throughbores 52 in the second housing component 26 (see FIGS. 4 and 5).

The upper portion of the first housing component 12 includes external threads 12e by which the upper housing component may be joined to a nut 54. The valve 10 may be mounted in a motor vehicle, or other environment, by passing the threaded portion 12e of the upper housing component 12 through an appropriate hole in the motor vehicle floorboard, or other mounting facility, indicated as F in FIGS. 1-3 and 7. The upper housing component 12 also features buttresses 12f which limit the upward movement of the upper housing component by contacting the underside of the floor F. Then, the nut 54 is threaded to that portion of the threaded segment 12e of the upper housing component 12 which protrudes through the floor F. The result is that the valve 10 is anchored to the motor vehicle, for example, with the nut 54 on the interior side of the floorboard F. Consequently, the valve 10 may not be removed from the motor vehicle without access to the interior of the vehicle.

The first and second housing components 12 and 26, respectively, are assembled with the locking mechanism 16, the snap ring 18, the valve stem spring 22 and the valve stem 24, the diaphragm seal 42, and the counter spring 40 positioned as shown in FIG. 2. The two housing components 12 and 26 are riveted together with rivets 48, and the valve then becomes essentially a sealed unit. An appropriate hole is provided in the floor F for the insertion of the first end 12a of the upper housing component 12, and the valve 10 is then fixed in place by the nut 54 being threaded down onto the first housing component. The flow line tubular members 32 and 36 of the motor vehicle to which the valve 10 is being applied are then joined to the inlet flow line receptacle 26e and the outlet flow line receptacle 26f, respectively, as discussed hereinbefore. The valve 10 is then ready for operation.

The valve 10 may be operated entirely by access to the top of the plunger device 16c from the interior of the motor vehicle. Thus, to close the valve 10 and lock it in closed configuration, the plunger device 16c is depressed from its first position, illustrated in FIG. 2, to its second position, shown in FIG. 3 in which the locking mechanism 16 itself locks the plunger device. In its second position, the plunger device 16c, through the sleeve 16d, holds the valve stem 24 pressed against the seat 26g with the diaphragm seal 42 compressed between the valve stem and the seat. The valve stem spring 22 provides sufficient resiliency to the action of the sleeve 16d and the valve stem 24 to prevent any undesirable wear due to the operation of the valve 10. However, the extent of the movement of the sleeve 16d to the second position with the valve stem spring 22 and the valve stem 24 is sufficient to overcome the action of the counter spring 40 pressing the diaphragm seal 42 from the opposite side. Thus, when the plunger 16c is in its second position, the valve 10 is in a closed configuration, with a fluid-tight seal between the diaphragm seal 42 and the annular seat 26g. This sealing prevents fluid entering the depression 26d through the inlet port 28a from flowing through the outlet port 30b into the outlet flow passage 30. With the valve in this closed configuration, the fluid fuel in the gasoline supply 34 is thus prevented from being drawn into the engine 38.

The valve may be released to its open configuration shown in FIG. 2 by operation of the key 20 in the upper side of the plunger device 16c in the interior of the motor vehicle. Rotation of the key 20 in the plunger device 16c causes the locking mechanism 16 to release the plunger device and propel it from its second position upwardly to its first position. Such upward movement of the plunger device 16c and the attached sleeve 16d raises the valve stem spring 22, permitting the counter spring 40 to raise the diaphragm seal 42 off of the seat 26g. Then, the fluid entering the depression 26d through the inlet port 28a from the fuel tank 34 and the inlet flow line tubular member 32 is able to flow through the outlet port 30b into the outlet flow passage 30 and along the outlet flow line tubular member 36 to the engine 38.

It will be appreciated from the foregoing discussion that the present invention includes a lockable valve that may be attached to a flow line passing along one side of a floorboard or wall, and may be operated to open or close the valve from the other side of the wall. In particular, the valve 10 of the present invention is applicable to the fuel flow line of a motor vehicle or other fuel-operated, engine-propelled device, to selectively prevent the supply of fuel to the engine. In such an application in a motor vehicle, the valve is operable from within the interior of the motor vehicle, and is furthermore secured against tampering by including a housing composed of two housing components which are riveted together. Thus, while the lockable valve of the present invention is in line along the fuel flow line leading from the fuel tank to the engine of the motor vehicle, the availability of the fuel in the tank for operation of the engine may be curtailed by the closing and locking of the valve. Then, only use of a key to unlock the valve from the interior of the motor vehicle will once again open the flow line so that the engine may be operated with fuel from the fuel tank. The lockable valve 10 of the present invention thus acts as a security device to prevent unauthorized use of the fuel in the tank to operate the engine. Consequently, the valve of the present invention may be used as an antitheft device to prevent the unauthorized taking of a motor vehicle.

The valve of the present invention provides certain advantages not found in the prior art. In the present invention, a pair of annular lips supply a clamping mechanism to hold the diaphragm seal in place between the first and second housing components, and cooperate with that seal to provide a more effective fluid-tight sealing about the depression 26d of the second housing component. Also, the flow line receptacles 26e and 26f are integrated in the valve housing to reduce the number of parts necessary to install the valve in working condition, and thereby simplify the operation of using the valve. Male-female coupling between the two housing components also insures that the housing components will be aligned rotationally and laterally relative to each other when the housing is assembled as shown in FIG. 2. Thus, by inserting the locking mechanism 16 within the upper housing component 12 so that the arcuate flange 16b consistently aligns in the keyed third passage 14c, the assembled valve 10 may always feature the same key orientation relative to the inlet and outlet flow line receptacles. The improvement in simplicity of design continues to the securing of the locking mechanism 16 within the first housing component 12 by a snap ring 18 rather than screws as used in the prior art. Finally, the upper and lower housing components 12 and 26, and even the nut 54, may be formed of molded plastic. Such material provides a housing which is relatively simple and quick to construct, is lightweight, durable, and strong, and at the same time exhibits a resistance to corrosion which allows the use of the valve of the present invention on the underside of a motor vehicle for extended periods of time without the need for attention to possible deterioration of the housing. Also, in this case, the fluid fuel flowing through the valve of the present invention is exposed only to the molded plastic of the second housing component, the counter spring, and the resilient diaphragm seal. Typical of the plastic which may be used to mold the housing components is a line of acetal resins available from E.I. DuPont De Nemours & Co. under the trademark DELRIN.

Thus, the valve of the present invention features a housing unit which is virtually unable to be disassembled, an improved fluid-tight seal between the two housing components, simpler and more practical means for securing the locking mechanism within the valve housing and of connecting the fluid flow line tubular members of the motor vehicle to the valve housing, and provides a housing unit which may be made of a material which allows for faster and more economical construction and results in a lightweight, corrosion-resistant valve housing. It will be appreciated that the improvements of the present invention over the prior art result in a more economical and practical product while at the same time providing a more secure, tamper-proof housing to achieve the main purpose of the lockable valve used as a security device, that is, to prevent, or at least to decrease the chances of, the motor vehicle being stolen or otherwise used without authorization.

The foregoing disclosure and description of the invention is illustrative and explanatory thereof, and various changes in the size, shape and materials as well as in the details of the illustrated construction may be made within the scope of the appended claims without departing from the spirit of the invention.

We claim:
1. A lockable valve for selectively prohibiting flow of fluid fuel from a fuel supply to a engine comprising:
   a) a molded plastic housing means, including multiple housing components mutually aligned by male and female coupling means and held together by rivet means;
   b) flow line receptacles, as integral parts of said housing means and equipped with anchoring shoulders, for receiving and anchoring flow line tubular members for conducting said fluid fuel from said fuel supply and to said engine, respectively;
   c) a valve stem and a seat for selectively closing said valve for prohibiting flow of said fluid fuel to said engine;
   d) a diaphragm seal, anchored by an annular clamping means formed by two opposed annular lips to fluidtight seal said housing means, for selectively fluid-tight sealing said valve stem to said seat to selectively close said valve; and
   e) locking means, held within said housing means by a snap ring and oriented by an arcuate flange cooperating with a keyed passage, equipped with plunger means carrying said valve stem, whereby said valve may be closed by depression of said plunger means from a first position to a second position, and opened only by unlocking said locking means to release said plunger means to return to said first position.

2. A lockable valve as defined in claim 1 further comprising mounting means for mounting said valve with said flow line receptacles on one side of a mounting facility while said valve may be opened and closed by access to said plunger means from the opposite side of said mounting facility.

3. A lockable valve as defined in claim 1 further comprising:
   a) a valve stem spring which joins said valve stem to said plunger means; and
   b) a counter spring, acting generally in opposition to said valve stem spring, for maintaining said diaphragm seal off of said seat when said plunger means is in said first position.

* * * * *